United States Patent

Endico

Patent Number: 5,858,430
Date of Patent: Jan. 12, 1999

[54] FOOD PRESERVATION AND DISINFECTION METHOD UTILIZING LOW TEMPERATURE DELAYED ONSET AQUEOUS PHASE OXIDATION

[76] Inventor: Felix W. Endico, 444 E. 86th St., New York, N.Y. 10028

[21] Appl. No.: 963,018

[22] Filed: Nov. 3, 1997

[51] Int. Cl.⁶ .............. A23B 4/00; A23B 7/00; A23L 3/00
[52] U.S. Cl. .............. 426/241; 422/21; 422/24; 426/335; 426/521; 426/524; 426/532
[58] Field of Search .................. 426/235, 241, 426/335, 532, 521, 524; 422/21, 24

[56] References Cited

U.S. PATENT DOCUMENTS

| | | | |
|---|---|---|---|
| 4,624,854 | 11/1986 | Naumann et al. | 426/241 |
| 4,849,237 | 7/1989 | Hurst | 426/332 |
| 5,328,706 | 7/1994 | Endico | 426/231 |
| 5,403,602 | 4/1995 | Endico | 426/231 |
| 5,405,631 | 4/1995 | Rosenthal | 426/235 |
| 5,783,242 | 7/1998 | Teague | 422/24 |

Primary Examiner—George Yeung
Attorney, Agent, or Firm—Natter & Natter

[57] ABSTRACT

A food preservation and disinfection method utilizes oxygen-enriched chilled water that is applied to the food product as ice formations or alternatively is sprayed on the food product to form a frozen surface glaze. Upon thawing the frozen food product, an oxidative reaction occurs under the influence of a temperature dependent catalyst accelerant. The oxygen enrichment is accomplished by dissolving ozone and hydrogen peroxide, in combination or independently, in chilled water.

20 Claims, 2 Drawing Sheets

FOOD PRESERVATION AND DISINFECTION METHOD UTILIZING LOW TEMPERATURE DELAYED ONSET AQUEOUS PHASE OXIDATION

BACKGROUND OF THE INVENTION

1. Field of the Invention

This invention relates generally to food-safety and especially to methods for safeguarding food production from food-borne diseases.

In particular, this invention concerns a method for food preservation and disinfection utilizing a low temperature delayed onset aqueous phase oxidation solution.

2. Background Art

Food sanitation is of serious concern to public health officials in view of the increased frequency of wide-spread outbreaks of food-borne diseases, such as hepatitis A, and other illnesses caused by salmonella, shigella, and *E. coli* bacteria. Of particular concern is the effectiveness of existing food-safety programs including inspection procedures. Food poisoning has also become more prominent for the reason that consumers are eating more minimally prepared foods. These foods are commonly processed at central locations for shipment to stores and restaurants. This provides additional opportunities for foods to become tainted in transit or during processing. The contamination and general spoilage of perishable food products is typically caused by the growth of microorganisms, enzyme actions and chemical reactions.

A commonly used method for preservation of food products is by refrigeration and/or cold storage. Low temperatures retard deterioration of the food product by slowing and/or inhibiting microbial activity and by decreasing the rate of adverse chemical reactions within the food.

In regard to specific food products, such as sea food, fish, beef, poultry, fruits and vegetables, these foods are usually chilled and packed in ice before shipment to food processors and wholesale food markets. The amount of time food can be preserved under cold storage depends upon the type of the food, the temperature, and other variables.

A shortcoming of dependence upon cold storage preservation techniques is that ice packing of food has time limitations and refrigeration by a mechanical equipment is usually expensive. A further deficiency of refrigerated storage is that after the food is removed, microbial activity increases rapidly.

The food industry has supplemented refrigeration techniques with chemical additives such as by treating ice with chlorination. The use of chemical additives, however, is subject to governmental restrictions and limitations. Other additives, such as tetracycline, have also been incorporated in ice for preserving freshly caught fish. A problem presented by chemical additives is that they must be rendered inert or the residues must be removed from the foods in compliance with F.D.A. and U.S.D.A. standards as promulgated in Generally Recognized As Safe (GRAS) protocol.

It has been noted that oxidation treatments, such as by use of ozone and hydrogen peroxide, leave little or no residue in the finished food product. The application of ozone as an oxidizing agent for food sterilization was discussed in U.S. Pat. No. 5,403,602. Another food manufacturing process utilizing hydrogen peroxide was disclosed in U.S. Pat. No. 5,328,706. The above-mentioned patents have integrated the oxidation method into the food processing procedure and are not directed to the combined functions of preserving and disinfecting of food products.

The application of ozonated water in a food disinfecting process is discussed in U.S. Pat. No. 4,849,237 as applied to sanitizing poultry carcasses. The use of ozone for sanitizing citrus fruit is disclosed in U.S. Pat. No. 5,405,631. The processes discussed in these last two mentioned patents do not rely upon a delayed onset oxidation procedure.

BRIEF SUMMARY OF THE INVENTION

Briefly, the method of this invention involves a food preservation and disinfection process utilizing oxygenated water for effecting a temperature dependent oxidation reaction under the influence of a catalyst.

The water is initially chilled and then fortified with ozone or hydrogen peroxide and preferably, with both of these oxidizing agents. The oxygen-enriched water is frozen prior to or after application to a food product. The oxidizing agents are effectively inactivated by the low temperatures.

An oxidase enzyme is preferably introduced to the chilled water prior to freezing. Alternatively, the enzyme may be applied to the surface of the food product prior to or during the thawing procedure. The enzyme activity is suspended by low temperatures, and preferably by transitory immobilization envelopment. Upon completion of the cold storage cycle, thermal energy is applied for releasing the ozone and the hydrogen peroxide which act directly upon microorganisms in the food.

An advantage of the method of this invention is that the application of oxidizing agents having different rates of decomposition provide multi-stage oxidation reactions for destroying microorganisms in the food.

Another aspect of the method of this invention is that concurrent enzyme activity potentiates the oxidative reaction.

Having thus summarized the invention, it will be seen that it is a preferred object thereof to provide a food preservation and disinfection method utilizing low temperature delayed onset aqueous phase oxidation.

Another preferred object of this invention is to provide a food preservation and disinfection method utilizing oxygen-fortified chilled water containing one or more oxygenic agents.

Still another preferred object of this invention is to provide a food preservation and disinfection method utilizing a temperature-initiated oxidation reaction.

With these ends in view, the invention finds embodiment in a method by which the aforementioned preferred objects and certain other preferred objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary procedure in accordance with the principles of this invention.

DETAILED DESCRIPTION OF THE INVENTION

With specific reference now to the drawings, it is stressed that the particulars shown and described herein are for the purpose of illustrative discussion of the process of this invention and are presented in the cause of providing what is believed to be the most useful and readily understood description of the principles and conceptual aspects of this invention. In this regard, no attempt has been made to show the process in more detail than is necessary for a fundamental understanding of the invention however, the description, in combination with the drawings, should make apparent to those skilled in the art, how the process may be applied in practice.

Figure 1:
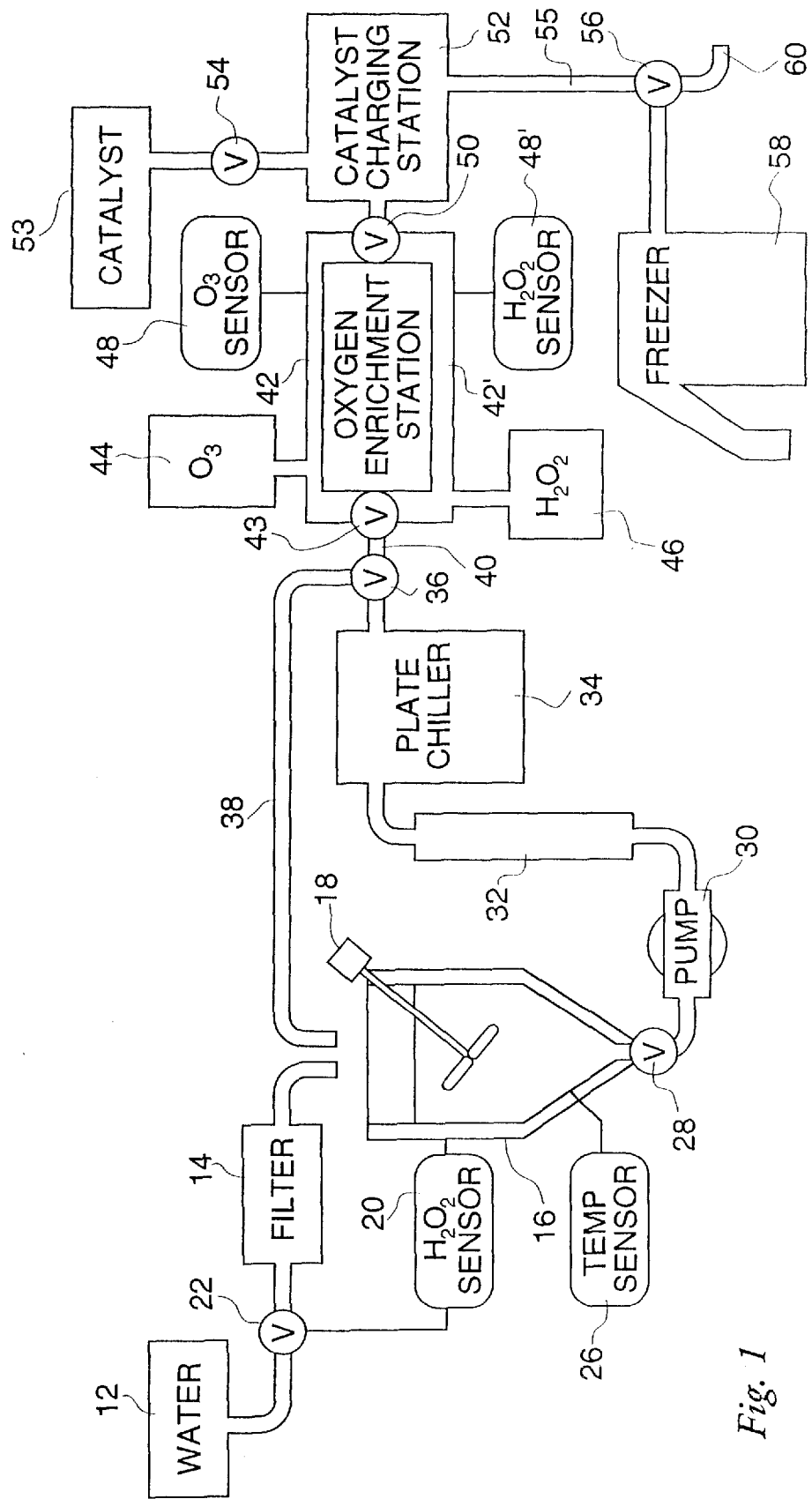
FIG. 1 is a schematic diagram illustrating an apparatus for manufacturing a low temperature delayed onset aqueous phase oxidation solution.

Referring now to FIG. 1, there is schematically illustrated an apparatus for manufacturing an oxygenated chilled water solution in accordance with this invention.

The initial stage of the process involves the introduction of water, at ambient temperature, from a holding tank 12. The water enters a filtering system 14, typically utilizing charcoal and/or ultraviolet radiation, for removing undesirable impurities. The water is then discharged into a mixing tank 16 preferably containing an agitator element such as a propeller mixer 18. The water charging operation is automated, such as by use of a hydrostatic float valve 20 which opens a valve 22 for controlling water inflow. When the mixing tank 16 is fully charged with water, the float valve 20 closes the valve 22.

The mixing tank 16, is typically a 400 gallon stainless steel vessel that is jacketed to provide for circulation of an iced brine solution or a freon gas to pre-chill the water. The temperature of the water in the tank 16 is constantly monitored by a thermostat 26.

The water is further chilled to a desired temperature by recirculation. For this purpose, a discharge valve 28 is opened and a pump 30 is actuated for circulating the water in the tank 16 through an ultraviolet (UV) chamber 32, e.g. a high intensity arc tube chamber such as manufactured by Aquionics, Inc. The UV irradiation is effective for killing microorganisms that are resistant to ozone and is also believed to increase the level of dissolved oxygen in solution.

The water is then passed through a plate chiller 34, e.g. a plate heat exchanger, such as manufactured by Chester-Jensen Co., Inc. The water flow is then directed by a valve 36 to a return conduit 38 leading to the mixing tank 16. This closed loop recirculation continues until the water reaches a temperature of between 33° F.–44° F. and preferably approximately 38° F. Note that the use of both of the jacketed tank 16 and the heat exchanger 34 may be redundant under some processing conditions.

When the targeted temperature is achieved, the valve 36 is actuated for directing the water flow through a conduit 40 to either or both of an oxygen-enrichment station 42,42". An entry valve 43, and an exit valve 50, selectively control the flow pattern. An ozone generator 44 and a hydrogen peroxide tank 46 are used independently, or in combination, for respectively introducing ozone and hydrogen peroxide into the water.

For the purpose of this illustrative embodiment, the generator 44 and the tank 46 are arranged in parallel. The ozone, is aspirated through a venturi into the water flowing through the station 42. A sensor 48 measures the concentration of the ozone. The water is recirculated through a closed loop (not shown). When the ozone concentration reaches between approximately 0.2 mg to 0.6mg per liter of water, the valve 50 is opened and the ozonated water then enters a catalyst charging station 52. A valve 54 next controls the introduction of a metered amount of an enzyme such as catalase or peroxidase, from a supply tank 53. The enzyme is preferably enveloped within microcapsules having a temperature-dependent permeability profile. This can be typically accomplished with gelatin or wax material envelopment designed to become permeable or dissolvable in water at a temperature of about 45° F. or greater. The enzyme can also be immobilized by absorption onto an insoluble matrix; entrapment within a gel; or encapsulated within a semi-permeable membrane. Other immobilization techniques include covalent binding of the enzyme to inorganic carriers and covalent cross-linking to natural and/or synthetic polymers.

Since the chilled water is at approximately 38° F., the microencapsulated enzyme will be inert and suspended within the oxygen-enriched water. The viscosity of the water is preferably increased to promote a greater degree of suspension. This can be accomplished by the introduction of guar gum at approximately 0.4% by volume.

With regard to the hydrogen peroxide charging the chilled water is channeled by the valve 43, through the oxygen-enrichment station 42'. Hydrogen peroxide from the tank 46 can be fed into the water by use of a metering manifold. A sensor 48' is used for determining when the hydrogen peroxide concentration achieves a 3%–10%, and preferably a 5%, by volume solution. The hydrogen peroxide in the tank 46 is typically a 35% standardized food-grade solution. The water is recirculated through a closed loop (not shown). When the 5% peroxide conditions are reached, the valve 50 is opened and the hydrogen peroxide in solution is directed to the catalyst charging station 52.

The oxygen-enriched water solution containing the microencapsulated enzyme and dissolved ozone or hydrogen peroxide or a combination of both, then flows through a discharge conduit 55. A valve 56 selectively diverts the flow either to a freezer 58 wherein the water solution is frozen and extruded as ice formations such as flaked ice, cubed ice or shaved ice. Alternatively, the valve 56 can divert the flow to an exit port 60 wherein the chilled water solution is subsequently sprayed onto food products to form a frozen glaze.

Figure 2:
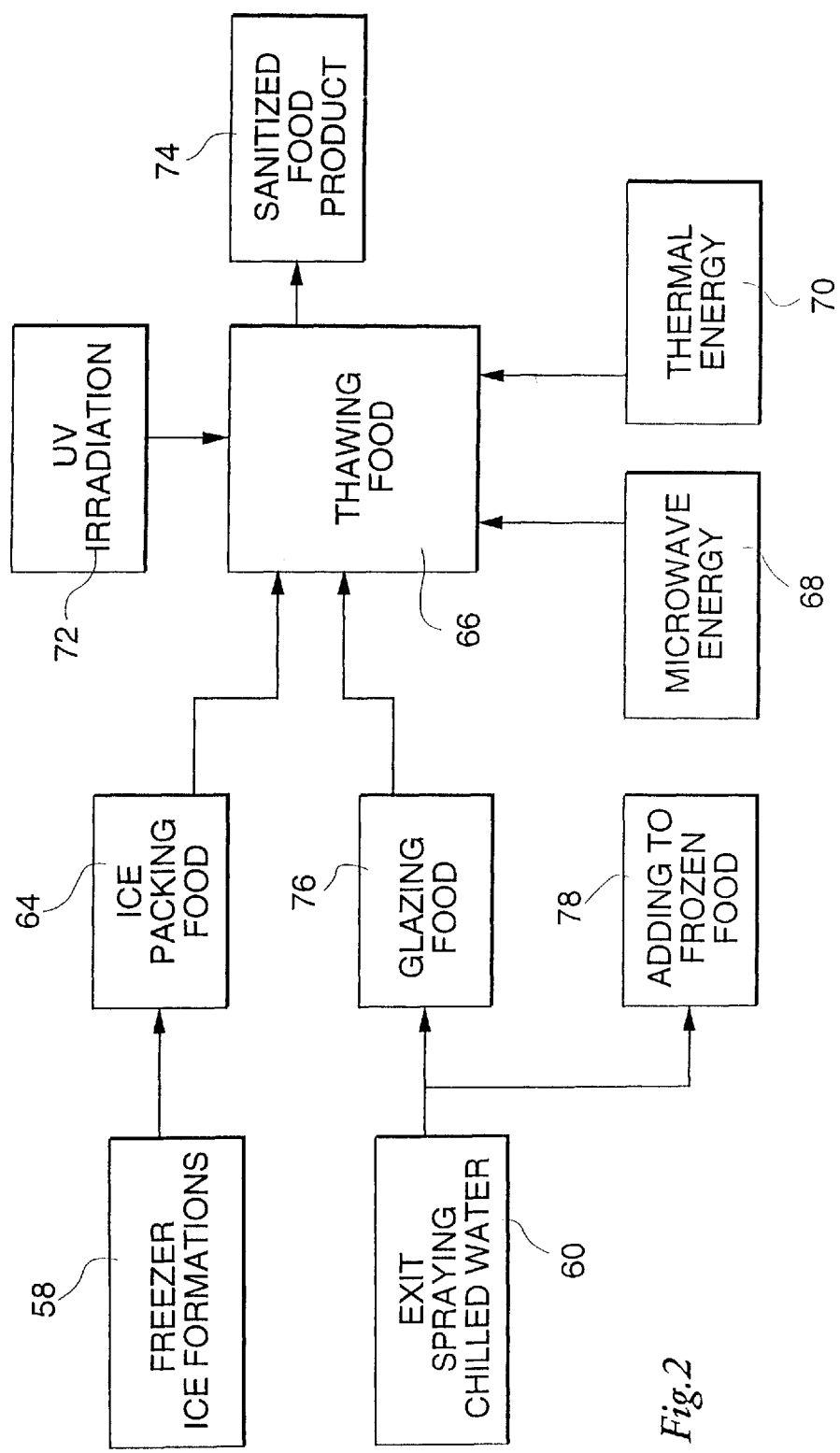
FIG. 2 is a flow diagram illustrating a food preservation and disinfection method utilizing the oxidation solution.

Further with regard to the application of the oxygenated chilled water solution for food preservation and disinfection, reference is made to the flow diagram of FIG. 2.

The frozen water in the various ice formations dispensed from the freezer 58 is utilized for ice packing food products as indicated at 64. The low temperature preserves the food during storage, transit and display for sale. As previously indicated, this form of cold storage is particularly suitable for meats, poultry, fish, fruits, and vegetables.

The thawing operation, as indicated at 66, can be achieved, for example, by slacking the food product in a refrigerator, by ambient air at room temperature, by warm water, etc. The temperature elevation can be accelerated by applying microwave energy 68 or by applying thermal energy 70. Each of the selected thawing modalities may be supplemented by the application of ultraviolet irradiation 72.

During the thawing procedure 66, the temperature of the oxygenated frozen water reaches the temperature activation point of the encapsulation and the enzyme intervention accelerates the decomposition of the ozone and hydrogen peroxide. The ozone reacts directly with the microorganisms and also forms oxidizing agents such as hydroxyl radicals that contribute to additional oxidizing reactions. The enzyme breaks down hydrogen peroxide to release molecular oxygen and hydroxyl radicals. Photolysis by ultraviolet irradiation 72 augments the decomposition of the ozone and hydrogen peroxide.

The combination of hydrogen peroxide and ozone in the oxygenated water provides an advanced oxidation process.

The ozone will decompose more rapidly than the hydrogen peroxide and will provide an initial anti-microbial reduction, the hydrogen peroxide will provide a secondary anti-microbial action. The actual disinfection is believed to occur as the oxidation reactions damage and/or destroy critical components of the microorganism. The enzyme will also effectively remove residual hydrogen peroxide and/or ozone such that a resultant sanitized food product 74 will be free of chemical residue.

In an alternative procedure, particularly with regard to seafood, the oxygenated chilled water as discharged from the exit port 60 is sprayed upon the food product to form a frozen surface glaze 76. During or prior to this stage a stabilizer such as guar gum or xanthan gum may be added to prevent cracking of the frozen glaze. The thawing procedure 66 will release the encapsulated enzyme to accelerate the oxidation reaction as described with regard to the ice packing modality.

It should be further noted that the food product can be treated independently with temperature-dependent encapsulated enzyme, prior to forming the frozen surface glaze 76 or during the thawing procedure 66.

Still another application of the oxygen-enriched chilled water discharged from exit port 60, is to incorporate the water as a moisture component in instant packaged frozen food products 78. In this application, the thawing procedure 66 will most likely, be at the consumer location and the optional ultraviolet irradiation application may not be available. However, the oxidation reaction, will provide a sanitized food product ready for consumption.

A further application of the oxygen-enriched chilled water is for use as an anti-microbial moisture component in raw meat products. The chilled water can also be used for vegetable transport and disinfecting water and for disinfecting wash down and rinse water.

If the food products have been pre-treated acidified e.g. with acetic acid, then treatment with the oxygenated water will form peracetic acid as the hydrogen peroxide reacts with the acetic acid. Peracetic acid is a highly effective bactericide.

It should thus be seen that there is provided a food preservation and disinfection process utilizing a delayed onset aqueous phase oxidation solution which achieves the various preferred objects of this invention and which is well adapted to meet conditions of practical use.

Since possible variations of the process might be made to the exemplary form set forth, it is understood that the processes shown and described should be interpreted as illustrative and not in a limiting sense.

Having thus described the invention, there is claimed as new and desired to be secured by Letters Patent:

1. A food preservation and disinfection method utilizing low temperature delayed onset aqueous phase oxidation comprising the steps of:
   (a) preparing oxygen-enriched chilled water,
   (b) preserving a food product by lowering the temperature of the food with said water, said water being in at least one of a liquid and a solid state, and
   (c) disinfecting the food product by raising the temperature of the water to initiate an aqueous phase oxidation reaction.

2. A food preservation and disinfection method as claimed in claim 1 wherein the oxygen-enrichment is provided by dissolving at least one of ozone and hydrogen peroxide in the chilled water.

3. A food preservation and disinfection method as claimed in claim 1 wherein the oxygen enrichment is provided by dissolving a combination of ozone and hydrogen peroxide in the chilled water.

4. A food preservation and disinfection method as claimed in claim 1 wherein the water is chilled to a temperature of approximately 38° F.

5. A food preservation and disinfection method as claimed in claim 1 including the preliminary step of:
   treating the chilled water with ultraviolet irradiation prior to the oxygen-enrichment step.

6. A food preservation and disinfection method as claimed in claim 1 including the intermediate step of:
   adding a temperature-dependent catalyst into the oxygen-enriched chilled water.

7. A food preservation and disinfection method as claimed in claim 6 wherein the catalyst is an oxidase enzyme.

8. A food preservation and disinfection method as claimed in claim 6 wherein the temperature-dependent catalyst is immobilized by microencapsulation.

9. A food preservation and disinfection method as claimed in claim 6 including the intermediate step of:
   increasing the viscosity of the chilled water for improving suspension characteristics of the catalyst in the water.

10. A food preservation and disinfection method as claimed in claim 1 including the steps of:
    freezing the oxygen-enriched chilled water to form ice formations.

11. A food preservation and disinfection method as claimed in claim 10 including the steps of:
    packing the food product in the ice formations to preserve the food product, and
    thawing the food product to release oxygen for oxidative disinfection.

12. A food preservation and disinfection method as claimed in claim 11 including the step of:
    applying at least one of thermal energy and microwave energy during the thawing step.

13. A food preservation and disinfection method as claimed in claim 11 including the additional step of:
    applying ultraviolet irradiation during the thawing step for augmenting the oxidative disinfection.

14. A food preservation and disinfection method as claimed in claim 2 wherein the ozone concentration is approximately 0.2 mg to 0.6 mg per liter of water.

15. A food preservation and disinfection method as claimed in claim 2 wherein the hydrogen peroxide concentration is about 5% by volume.

16. A food preservation and disinfection method as claimed in claim 6 including the intermediate steps of:
    spraying the oxygen-enriched chilled water on the food product;
    lowering the temperature of the treated food product to form a frozen surface glaze; and
    thawing the food product to activate a catalyzed oxidative disinfecting reaction.

17. A food preservation and disinfection method as claimed in claim 16 including the further step of:
    irradiating the food product with ultraviolet light during the thawing step.

18. A food preservation and disinfection method as claimed in claim 1 including the intermediate steps of:
    applying an inactivated temperature-dependent catalyst to the surface of a food product;

spraying the food product with said oxygen-enriched chilled water;

lowering the temperature of the treated food product to form a frozen surface glaze; and elevating the temperature of the food product to activate a catalyzed oxidative disinfecting reaction.

19. A food preservation and disinfection method utilizing low temperature delayed onset aqueous phase oxidation comprising the steps of:

(a) preparing oxygen-enriched chilled water;

(b) freezing the water to form ice formations;

(c) preserving a food product with said ice formations;

(d) introducing an immobilized temperature-dependent catalyst to the ice formations; and (e) disinfecting the food product by elevating the temperature of the ice formations to release the oxygen and to activate the catalyst for initiating an oxidative reaction.

20. A food preservation and disinfection method utilizing low temperature delayed onset aqueous phase oxidation comprising the steps of:

(a) preparing oxygen-enriched chilled water;

(b) adding said chilled water as a moisture component to frozen food products; and (c) disinfecting the frozen food products during thawing by temperature-initiated oxidative reaction.

* * * * *